United States Patent
An et al.

(10) Patent No.: US 8,656,403 B2
(45) Date of Patent: Feb. 18, 2014

(54) NEGOTIATION MANAGEMENT IN DATA PROCESSING SYSTEMS

(75) Inventors: Bo An, Amherst, MA (US); Frederick Douglis, Basking Ridge, NJ (US); Bradley William Fawcett, Byron, MN (US); Anton V. Riabov, Ossining, NY (US); Fan Ye, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1326 days.

(21) Appl. No.: 12/112,142

(22) Filed: Apr. 30, 2008

(65) Prior Publication Data

US 2009/0282415 A1 Nov. 12, 2009

(51) Int. Cl.
*G06F 9/46* (2006.01)

(52) U.S. Cl.
USPC .......................................... 718/104

(58) Field of Classification Search
None
See application file for complete search history.

(56) References Cited

U.S. PATENT DOCUMENTS

2007/0005739 A1* 1/2007 Carey et al. ................... 709/223
2008/0071716 A1* 3/2008 Anderson et al. ............... 706/45

OTHER PUBLICATIONS

Mohan Baruwal Chhetri et. al. (A Coordinated Architecture for the Agent-based Service Level Agreement Negotiation ofWeb Service Composition, May 8, 2006).*
D. Ouelhadj et. al. (A Multi-agent Infrastructure and a Service Level Agreement Negotiation Protocol for Robust Scheduling in Grid Computing, 2005).*
Patrick C. K. Hung et. al. (Web Services Discovery Based on the Trade-off between Quality and Cost of Service: A Tokenbased Approach, Aug. 2003).*
Bo An—Continuous-Time Negotiation Mechanism for software Agents Dec. 2006.*
Jun Yan—Autonomous service level agreement negotiation for service composition provision 2007.*
Jianshu Weng—Dynamic Negotiations for Grid services 2004.*
Hrishikesh J. Goradia—Automated Negotiations Among Autonomous Agents in Negotiation Networks 2007.*
Jakub Brzostowski et. al. (Three decision-making Mechanisms to facilitate negotiation of service level agreements for web service compositions, 2007).*
Autonomous service level agreement negotiation for service composition provision (Jun Yan et al. Feb. 2007).*

(Continued)

*Primary Examiner* — Emerson Puente
*Assistant Examiner* — Sisley Kim
(74) *Attorney, Agent, or Firm* — William Stock; Ryan, Mason & Lewis, LLP (57) ABSTRACT

Techniques are disclosed for optimizing schedules used in implementing plans for performing tasks in data processing systems. For example, an automated method of negotiating for resources in a data processing system, wherein the data processing system comprises multiple sites, comprises a negotiation management component of a computer system at a given one of the sites performing the following steps. One or more tasks from at least one source of one or more plans are obtained. Each plan is annotated with one or more needed resources and one or more potential resource providers at one or more sites in the data processing system. An optimized resource negotiation schedule based on the one or more obtained tasks is computed. The schedule comprises an order in which resources are negotiated. In accordance with the optimized resource negotiation schedule, a request for each needed resource is sent to the one or more potential resource providers such that a negotiation process is performed between the negotiation management component and at least one of the potential resource providers.

19 Claims, 5 Drawing Sheets

(56) References Cited

OTHER PUBLICATIONS

A. Andrieux et al., "Grid Resource Allocation Agreement Protocol (GRAAP) WG," GFD-R-P.107, http://forge.gridforum.org/sf/projects/graap-wg, Mar. 2007, pp. 1-81.

M. Branson et al., "CLASP: Collaborating, Autonomous Data Stream Processing Systems," In Proc. of the ACM/IFIP/USENIX 8th International Middleware Conference, 2007, http://www.research.ibm.com/people/f/fdouglis/papers/coopstreams-mw.pdf, pp. 1-20.

E. Deelman et al., "Pegasus: A Framework for Mapping Complex Scientific Workflows onto Distributed Systems," Scientific Programming Journal, 2005, pp. 219-237, vol. 13.

I. Foster et al., "The Anatomy of the Grid: Enabling Scalable Virtual Organizations," Intl. Journal of Supercomputer Applications, 2001, pp. 1-25.

N.R. Jennings et al., "Automated Negotiation: Prospects, Methods and Challenges," Group Decision and Negotiation, 2001, pp. 199-215, vol. 10, No. 2.

R.H. Mohring et al., "Approximation in Stochastic Scheduling: The Power of LP-Based Priority Policies," Journal of the ACM, Nov. 1999, pp. 924-942, vol. 46, No. 6.

A. Riabov et al., "Planning for Stream Processing Systems," In Proc. of the Twentieth National Conference on Artificial Intelligence, 2005, pp. 1-6.

A.R. Lomuscio et al., "A Classification Scheme for Negotiation in Electronic Commerce," Group Decision Negotiation, 2003, pp. 31-56, vol. 12, No. 1.

\* cited by examiner

| Algorithm 1 Voting algorithm for the single-plan case |
| --- |
| Input: Agreement set $AG$, plan $PL$, deadline $\tau'$. |
| Output: A schedule $\Upsilon$. |
| Data Structure: $V(r)$ for each resource $r \in RT^t(PL)$. |

```
1:    Let Size = 1, V(r) = 0 for each resource r ∈ RT^t(PL).
2:    repeat
3:        Size ++;
4:        for each combination of resources R ⊆ RT^t(PL) where
          |R| = Size do
5:            if deadline has not approached then
6:                Find the best schedule Γ for the set of resource R;
7:                for each resource r ∈ R do
8:                    if r is the i^th resource in Γ then
9:                        V(r) = V(r) + |R| + 1 - i;
10:                   end if
11:               end for
12:           end if
13:       end for
14:       Generate plan Υ in which resource r is behind resource r'
          if V(r) < V(r')
15:   until scheduling deadline is approached or Size == |RT^t(PL)|
16:   return Υ
```

FIG. 4

| Algorithm 2 Negotiation Scheduling Algorithm |
|---|
| Input: Plan set $PS$, deadline $\tau$, reserve price $\delta$.<br>Output: A plan $PL^o$ with agreement or "failure".<br>Data Structure: Task set $T$, agreement set $AG$, feasible plan set $PS^t$. |
| 1:    Let $t = 0$, $T = \emptyset$, $AG = \emptyset$, $PS^o = PS$, fail=false, $PL^o = \emptyset$.<br>2:    repeat<br>3:       Step 1: initialization (Algorithm 3)<br><br>4:       Step 2: revoke agreements and stop negotiation:<br>5:       if $PL^o$ != null then<br>6:         revoke agreements in $AG$ which is not needed for $PL^o$<br>7:         return $PL^o$ with agreements<br>8:       else<br>9:         if $|PS^t| = 0$ then<br>10:          revoke all agreements in $AG$<br>11:          return "failure"<br>12:         else<br>13:          revoke agreements which are not needed in any plan in $PS^t$<br>14:         end if<br>15:       end if<br><br>16:       Step 3: submit a proposal<br>17:       for each resource $r \in RT^t(PS^t)$ which has not been negotiated do<br>18:         compute its weight $w(r)$<br>19:       end for<br>20:       Let the task at $t$ be $\max_{r \in RT^t(PS^t)} w(r)$ and submit it to $PG$;<br><br>21:    $t$ ++;<br>22:    $PS^t = PS^{t-1}$;<br>23:    until false |

FIG. 5

| Algorithm 3 Initialization |
|---|
| 1:   if $t == 0$ then |
| 2:     for each $PL \in PS^t$ do |
| 3:       remove $PL$ from $PS^t$ if $\sum_{r \in PL} t(r) > \tau$ or $\sum_{r \in PL} c(r) \geq (1 + \beta)\delta$ |
| 4:     end for |
| 5:   else |
| 6:     if $PG$ fails to get resource $T^{t-1}$ then |
| 7:       remove plans which need resource $T^{t-1}$ from $PS^t$ |
| 8:       for each $PL \in PS^t$ do |
| 9:         remove $PL$ from $PS^t$ if $\tau - \sum_{t'=0}^{t-1} t(T^{t'})$ is not enough to get the resources having not been negotiated in plan $PL$ |
| 10:       end for |
| 11:     else |
| 12:       if some plans' resource requirements have been satisfied then |
| 13:         Let $PL^o$ be the plan which minimize the sum of the cost for the agreements needed by the plan and the penalty for the remaining agreements |
| 14:       end if |
| 15:     end if |
| 16:   end if |

FIG. 6

NEGOTIATION MANAGEMENT IN DATA PROCESSING SYSTEMS

This invention was made with Government support under Contract No. H98230-07-C-0383 awarded by the Department of Defense. The Government has certain rights in the invention.

FIELD OF THE INVENTION

The present invention relates to data processing systems and, more particularly, to techniques for optimizing schedules used in implementing plans for performing tasks in such data processing systems.

BACKGROUND OF THE INVENTION

In cooperating data processing systems such as grid-based systems and collaborative streaming analysis systems, autonomous sites in the system can establish "agreements" there between to arrange access to remote resources for a period of time. For example, A. Andrieux et al., "Web Services Agreement Specification (WS-Agreement)," Version 2006/07, GWD-R (Proposed Recommendation), Grid Resource Allocation Agreement Protocol (GRAAP) WGGRAAP-WG, July 2006, the disclosure of which is incorporated by reference herein, describes a protocol for establishing such agreements. The determination of which resources to reserve to accomplish a task need not be known a priori, because multiple plans for accomplishing the same task are available and they may require access to different resources.

Given a processing task, multiple functionally equivalent plans can be generated, e.g., through a planner component at a site. Each plan requires a set of resources, possibly from other sites in the system. The site can use any candidate plan to accomplish the processing task, with different performance/cost tradeoffs. To deploy a plan, the site needs to obtain all the resources required by that plan. It makes agreements with other sites, which control access to their resources. These agreements need to be negotiated between sites before the plan can be executed.

SUMMARY OF THE INVENTION

Principles of the invention provide techniques for optimizing schedules used in implementing plans for performing tasks in data processing systems.

For example, in one embodiment of the invention, an automated method of negotiating for resources in a data processing system, wherein the data processing system comprises multiple sites, comprises a negotiation management component of a computer system at a given one of the sites performing the following steps. One or more tasks from at least one source of one or more plans are obtained. Each plan is annotated with one or more needed resources and one or more potential resource providers at one or more sites in the data processing system. An optimized resource negotiation schedule based on the one or more obtained tasks is computed. The schedule comprises an order in which resources are negotiated. In accordance with the optimized resource negotiation schedule, a request for each needed resource is sent to the one or more potential resource providers such that a negotiation process is performed between the negotiation management component and at least one of the potential resource providers.

When an agreement is reached between the negotiation management component and the potential resource provider, the negotiation management component may send the agreement to the task source from which one or more plans were obtained such that at least one of the one or more plans are executable using the negotiated agreement.

The negotiation management component may comprise a scheduler and a proposal generator such that the scheduler performs the plan obtaining step and the optimized resource negotiation schedule computing step, and the proposal generator performs the request sending step in accordance with the optimized resource negotiation schedule.

These and other objects, features and advantages of the present invention will become apparent from the following detailed description of illustrative embodiments thereof, which is to be read in connection with the accompanying drawings.

DETAILED DESCRIPTION

While illustrative embodiments of the invention will be described below in the context of a collaborating, autonomous data stream processing system, principles of the invention are not limited thereto. That is, principles of the invention are more generally applicable to any data processing environment in which improved negotiation scheduling is desirable. That is, the proposed heuristics described herein can be applied in scheduling for resource acquisition in many other application domains, by way of example but not limited to, multi-agent manufacturing systems, autonomic and service oriented computing, dynamic web/grid service composition, virtual chain management, workflow, and enterprise integration.

Furthermore, it is to be understood that the phrase "optimized resource negotiation schedule" (or "optimized schedule" or similar forms thereof) is intended to refer to a schedule that is determined using one or more of the heuristics described herein, and is also intended to include the "optimal schedule" if such an ideal schedule is so attainable given the circumstances.

Accordingly, in one illustrative embodiment, we propose a negotiation management (NM) system, which is a subcomponent of a collaborative stream processing system. One example of a collaborative stream processing system is the CLASP system disclosed in M. Branson et al. "CLASP: Collaborating, Autonomous Data Stream Processing Systems,"

In Proc. of the ACM/IFIP/USENIX 8$^{th}$ International Middleware Conference, pp. 348-367, 2007, the disclosure of which is incorporated by reference herein. However, it is to be understood that principles of the invention are not limited to implementation in a CLASP system.

In a CLASP system, a job is an execution unit that accomplishes certain work through stream analysis. A job takes the form of a processing graph, comprised of resources, e.g., data sources and processing elements (PEs), which are interconnected in a certain manner. Examples of resources may include but not be limited to central processing unit (CPU) processing power, memory, storage space, data sources, processing code, etc. These resources might be located at multiple different sites. Due to the potentially large numbers of data sources and PEs needed in complex jobs, and the existence of functionally equivalent processing graphs, it is infeasible for human users to manually construct and identify the best alternative graph. The CLASP system has a planner component that can construct processing graphs automatically from high-level descriptions of desired results. Many resources needed in plans are accessed exclusively and must be reserved beforehand.

In order for a site to reserve a limited resource from another site, it establishes an agreement with the other site, specifying the price of sharing the resource. In general, the NM system proposed according to principles of the invention conducts automated negotiation among multiple sites in the data stream processing system to select the best candidate sites with which to negotiate and then select the best execution plan given the obtained agreements.

As will be described below in detail, illustrative principles of the invention provide a negotiation management architecture that includes two modules: a negotiation scheduler and a proposal generator. In general, the scheduler receives a number of tasks, each of which is annotated with the resources needed and potential resource provider sites. Also part of each task, and thus also negotiated, are such things as cost, a willingness to pay, and a deadline. The scheduler may adopt sequential negotiation for obtaining agreements of resources. Given N resources to accomplish a task, a site may negotiate one resource at a time, although this is not a requirement. The scheduler sends a negotiation task to the proposal generator, which will send requests to possibly multiple sites that can provide the resource. The proposal generator of those sites will either accept the request, or propose different terms (e.g., asking for a higher price), upon which this site's proposal generator will send a new request based on the terms. After possible multiple rounds of back-and-forth request/proposal, finally an agreement is obtained from one provider site, or no agreement is obtained from any site. The scheduler will collect such negotiation results, i.e., the agreements, and return them to whomever or whatever system submitted the tasks. Based on the obtained agreements, one candidate plan should be selected and executed to accomplish the task using the obtained agreements. Any agreements that have been obtained but are not needed by the candidate plan may at this point be canceled.

Canceling an existing agreement raises an important issue for consideration in the negotiation management protocol. As described later, the provider or consumer of a resource can "revoke" an agreement before its negotiated termination date. In general, there is a monetary penalty for revocation, which compensates the other party for the cost or inconvenience of lost opportunity (for a resource provider) or an aborted plan (for a resource consumer).

Advantageously, as will be shown, principles of the invention optimize the total negotiation time and payment for making agreements and revoking agreements given the task set. The scheduler reaches agreements before the deadline approaches. The scheduler finds the set of favorable agreements in terms of the cost of agreements. The scheduler considers the penalty when it needs to revoke some agreements made before. One key issue is the order in which requests for resources are sent to other sites. It will determine the total time and budget actually spent. Principles of the invention consider a number of factors to optimize the order, including but not limited to, the cost of the resource, the penalty of revoking an agreement after entering it, the existence and length of a short grace period for revoking an agreement without penalty when first establishing an agreement, the ability to reuse a resource from one task to satisfy an alternative task, and other factors.

Figure 1:
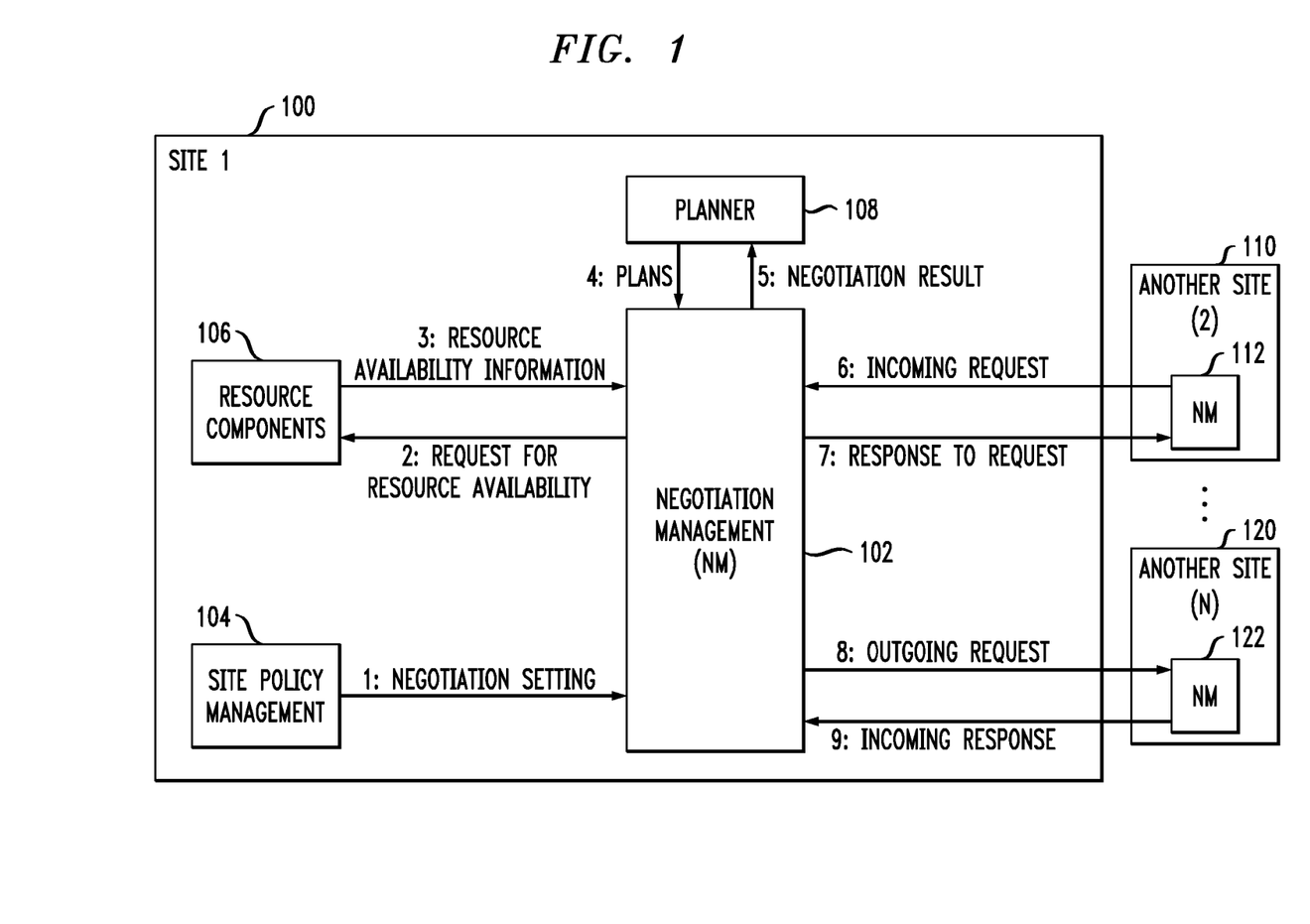
FIG. 1 illustrates a data stream processing system environment with negotiation management implemented therein, according to an embodiment of the invention.

Turning now to the figures, FIG. 1 illustrates a data stream processing system environment with negotiation management techniques of the invention implemented therein. As shown, each "site" in the data stream processing system comprises a NM component. Each site may be a separate location, remote from another site. Alternatively, two sites may be collocated. By way of example only, each site could be a separate data center comprising multiple servers and memory devices or other processing/storage devices that can be used to perform a requested task.

As shown in FIG. 1, site 1 is in communication with multiple other sites (2 through N). Communication can be via a public network (e.g., Internet), a private network (e.g., local area network), or some combination thereof. While each site may comprise many other components, only components relevant to an understanding of the principles of the invention are shown in FIG. 1.

Thus, site 1 (100) comprises NM component 102, site policy management component 104, resource components 106, and planner component 108. For the sake of simplicity, the other sites in FIG. 1 illustrate only their respective NM component, i.e., NM component 112 in site 2 (110), and NM component 122 in site N (120).

The site policy management module specifies site policies. Site policies can be different for each site. Site policies define negotiation settings for a site, e.g., the highest price of a resource, negotiation strategies, etc. Once one or more site policies are set, the site acts in accordance with its site policies. Further, each site comprises resource components. While not limited thereto, resources components (or simply "resources") may comprise data sources and processing elements (PEs). Also, the planner component (or simply "planner") generates plans for each task (job) to be performed by the site. It is to be appreciated that, in one embodiment, the planner is implemented according to the techniques disclosed in U.S. Patent Application No. 20080071716 entitled "Apparatus and Method of Planning Through Generation of Multiple Efficient Plans," the disclosure of which is incorporated by reference herein. It is also to be appreciated that tasks depend on the particular application being hosted on the resources, e.g., electronic commerce applications, complex computation services, data mining services, etc. Still further, one site may need one or more resources from another site to perform its own tasks. As will be explained in detail, NM components of different sites interact with each other to conduct negotiations for needed resources.

To conduct negotiation, each NM component should have the following information: 1) negotiation settings; 2) negotiation tasks; and 3) resource usage information. In general, the information flows related to an NM component include the following (referenced as information flows 1. through 9. in FIG. 1).

1. Negotiation settings: NM checks out negotiation-related settings (e.g., negotiation strategy) from its site policies. Data in the flow may include information pertaining to the reserve price of each resource (i.e., the highest amount of money the scheduler can use to establish an agreement for that resource), how to make a concession (i.e., compromise to bring the price of a resource closer to the other party), etc.

2. Request for resource availability: When NM receives an incoming request for a resource, NM needs to check 1) whether its owner has such a resource, 2) whether the resource is available for the particular requesting site; and 3) when the resource will be available. Data in the flow may include constraints on the resource, such as specific attributes or times when it must be available. There are many ways to represent constraints on a request, like whether the resource will be available after 4 PM, whether the resource will be available between 4 PM to 7 PM, etc.

3. Resource availability information: Resource components provide information about resource availability to the NM component. The resource availability information includes both the present availability and future availability. Data in the flow may include information on whether the resource is available and when it will be available and for how long. Resource components may, for example, only need to list all the periods during which the resource is not available.

4. Plans: After planning, the planner will send all the plans to the NM component. The NM may find that some resource requirements can not be satisfied at the local site, in which case it will negotiate with other sites to make agreements. Here we assume that each site will reserve and use its own resource if available rather than negotiating with another site for the resource. However, this does not have to be the case. For example, if other sites can provide the resource at lower cost, it may be preferable to use that of other sites. Data in the flow may include information pertaining to the identification of the PEs in each plan, how the PEs connect to each other, and identification of a set of sites which can run a specific PE.

5. Negotiation result: The NM will return negotiation results to the planner after negotiation finishes or the negotiation deadline is reached. Data in the flow may include failure of negotiation or a plan with a set of agreements, each agreement corresponding to one resource in that plan. Each agreement may have the following properties: negotiation task ID, agreement ID, resource ID, agreed price.

6. Incoming request: Each NM may receive requests about resource sharing from other sites. Data in the flow may include negotiation task ID, sender site ID, unique identifying indices for a resource, and a negotiation proposal, which consists of information about how to use a resource and how much the requesting site is willing to pay.

7. Response to request: After receiving an incoming request, the NM responds to the request based on resource availability and its negotiation strategy. It may accept the request, reject the request, or make a counter-offer proposal which includes an asking price for the resource.

8. Outgoing request: If the resource requested is for a different site's resource, it will make an outgoing request to other sites to provide the resource. Data in the flow includes information similar to that in flow 6.

9. Incoming response: Other sites' response. Data in the flow may include information similar to that in flow 7.

It is to be appreciated that after an agreement is finally made, the NM component reports the agreement to the subject resource components and the subject resource components make updates accordingly, such as marking the resource as reserved for the agreement's ID.

It is also to be appreciated that the above flows are for illustration purposes only, and thus principles of the invention are not intended to be limited to those flows or to their sequential order.

Figure 2:
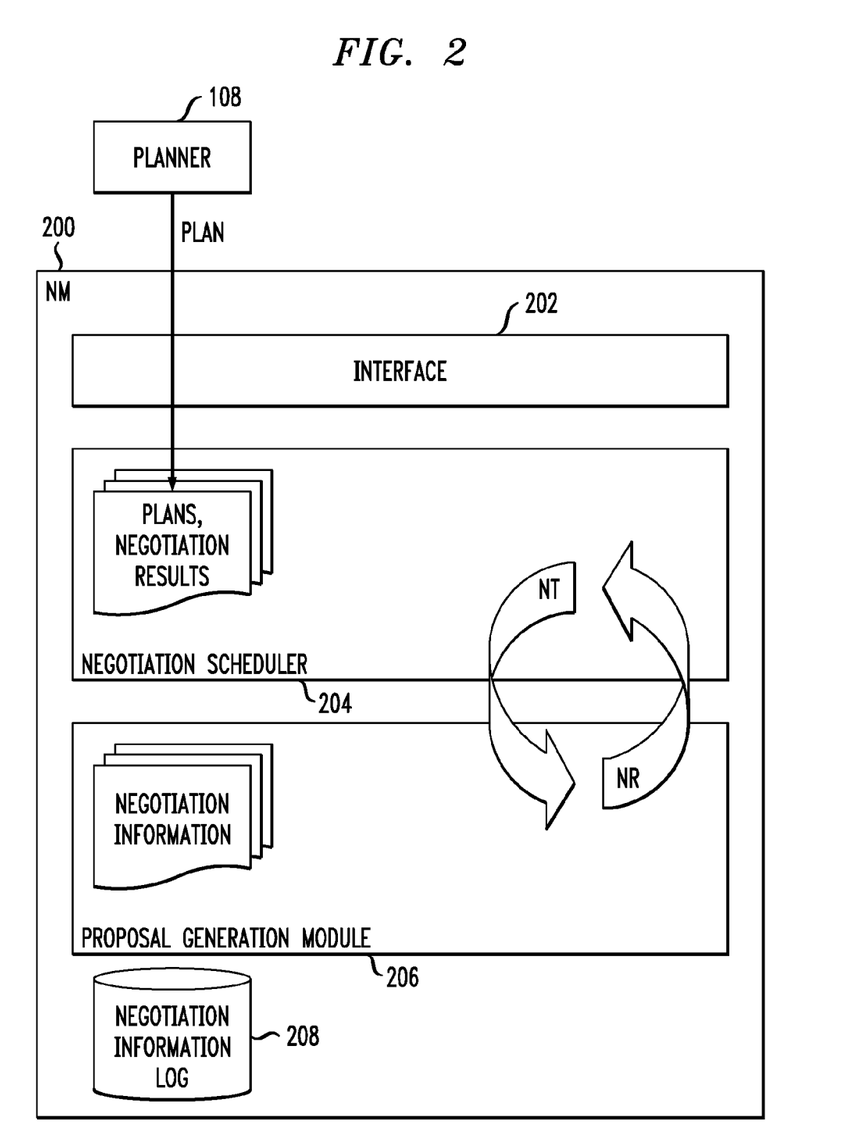
FIG. 2 illustrates a negotiation management component, according to an embodiment of the invention.

FIG. 2 shows details of an illustrative NM component 200.

Interface 202 provides the functions to be used by other components and local modules to submit plans, resource availability information, requests, etc. Further, as shown, the NM component has two main modules: Scheduler 204 and Proposal Generator (PG) 206.

Scheduler 204 receives multiple plans from the planner (108) and determines the best negotiation schedule, i.e., the order in which resources are negotiated. Then the scheduler submits negotiation tasks (NT) to PG 206 in that order. Each negotiation task asks for one resource that appears in the plans. PG conducts sequential negotiations to get the resources specified in negotiation tasks, thus yielding negotiation results (NR). To be successful, the scheduler should satisfy all the resources required by at least one plan within the cost and time constraints specified for the plan.

Negotiation information is a data structure which stores the negotiation tasks, incoming proposals, etc. Also, the scheduler stores plan information and negotiation results from the PG. After a negotiation is finished, the related information is moved from the negotiation information structure to negotiation information log 208. The PG may visit the information log to assist its decision making.

The remainder of the detailed description focuses on the optimization problem of the scheduler, i.e., finding the best negotiation schedule. The schedule determines whether any plan can be satisfied; if so, which plan is satisfiable, and at what cost. Determining the optimized negotiation schedule is non-trivial given multiple plans from which to choose and multiple resources in each plan. The scheduler also faces both time and budget constraints within which the negotiation should finish. Moreover, the outcome of negotiated resources affects the schedule of remaining resources, adding to the complexity of the problem. Naïve methods such as exhaustive search and randomized approach are either too expensive ($\mathcal{O}(n!)$ complexity) or yield low performance.

Advantageously, we propose heuristics that trade between complexity and utility. We first provide a voting-based heuristic that reduces the complexity to $\mathcal{O}(mn^q)$. We then present a weight-based heuristic which has even less complexity $\mathcal{O}(mn)$, with comparable utility. Experimental results show that the proposed approaches achieve almost 50% higher negotiation utility than a randomized approach and produce utilities within 90% of that of the optimized schedule with reasonable plan sizes.

The remainder of the detailed description is organized as follows. The optimization problem is introduced in Section I. Section II introduces the voting-based heuristic and Section III presents the weight-based heuristic.

I. Schedule Optimization

The optimization problem described herein can be treated as a stochastic scheduling problem. Stochastic scheduling is concerned with scheduling problems in which the processing times of tasks/jobs are modeled as random variables. Thus the processing time of a job is not known until it is complete. Our optimization problem is different from most stochastic scheduling problems in that there are multiple candidate plans for a task/job. In addition, the scheduler faces both deadline and budget constraints.

As the scheduler (e.g., scheduler 204 shown in FIG. 2) has multiple plans from which to choose and each plan has multiple resource requirements, the scheduler needs to determine the order in which to negotiate resources.

Some variables used in this formulation are summarized below:

τ scheduling deadline
δ the reserve price for the scheduling
$\mathcal{PS}$ plans submitted to the schedule
$\mathcal{PS}^t$ feasible plans at the scheduling round t
$\mathcal{PL}$ the set of resources in the plan PL
t(r) the negotiation time for getting resource r
c(r) the price for getting resource r
p(r) the probability that PG can get resource r successfully
$T^t$ the resource in the negotiation task at round t
$AG^t$ the set of agreements at round t The planner (e.g., planner 108 shown in FIG. 2) generates a set of plans $\mathcal{PS}$, and each plan is comprised of a set of resources. The resources in plan PL are $\mathcal{PL}$. Without loss of generality, we assume a resource appears at most once in any single plan. However, our approach can be extended to accommodate the situation that one resource appears more than once in a plan. The planner will then submit the plans to the scheduler and ask the scheduler to make agreements to satisfy the resource requirements of any one of the plans. The planner will also specify: (1) the reserve price δ, i.e., the highest amount of money the scheduler can use to make agreements; and (2) the deadline τ, i.e., the longest amount of time the scheduler can use to do scheduling and ask PG (e.g., proposal generation module 206 shown in FIG. 2) to make agreements. In one embodiment, the planner submits all plans to the scheduler at the same time before scheduling.

After receiving plan(s) from the planner, the scheduler submits one task (a resource) to PG. After receiving the negotiation result from PG, scheduling enters the next round: the scheduler selects another task to submit to PG. The result of a negotiation task could be "success," which indicates that PG made an agreement, or "failure," which indicates that PG failed to get the resource.

Resource consumers can revoke agreements made before at the cost of paying a penalty. The penalty depends on the price of the agreement and the period from the agreement making time to the revocation time. In general, the higher the price, or the later the revocation of an agreement, the greater the penalty. Assume the price of an agreement Ag is Prc(Ag), the agreement making time is $T_{mk}(Ag)$ and the agreement revoking time is $T_{ruk}(Ag)$. We assume a linear penalty function as a function of price and duration: specifically, the penalty is $\rho(\text{Prc}(Ag), T_{ruk}(Ag)-T_{mk}(Ag))=\min(\alpha \text{Prc}(Ag)(T_{ruk}(Ag)-T_{mk}(Ag)), \text{Prc}(Ag))$, where $\alpha \in (0,1]$. Other forms of penalty functions are possible but we take this simple form in this illustrative embodiment.

The planner gives the reserve price (budget) to the scheduler, whose goal is to minimize the spending for getting all the agreements for one plan. The scheduler will report the scheduling result to the planner before the deadline approaches. A scheduling result could be either a "failure" notification or a plan with a set of agreements which can satisfy resource requirements of the plan. The cost of the planner includes the prices of the agreements for that plan and penalties incurred by revocation. For ease of analysis, we treat the utility of the planner as the utility of the scheduler. The scheduler attempts to minimize the spending, thus maximizing its own utility, defined as:

$$u = \begin{cases} (1+\beta)\delta - \text{Prc}(\mathcal{AG}) - \rho(\mathcal{AG}) \\ -\rho(\mathcal{AG}) \end{cases}$$

if scheduling succeeds otherwise where $\text{Prc}(\mathcal{AG})$ is the price of all non-revoked agreements and $\rho(\mathcal{AG})$ is the penalty for revocation. When scheduling succeeds, the scheduler needs to pay for agreements and penalties and $\delta - \text{Prc}(\mathcal{AG}) - \rho(\mathcal{AG})$ is a bonus for cost savings. βδ is another bonus for successful scheduling; it ensures that the scheduler gets some utility for succeeding, even it has spent all the budget δ for negotiation. Without this extra bonus, a scheduler that succeeds but spends all the budget gets zero utility, as if it had done nothing at all.

If scheduling fails, the scheduler receives no bonus but needs to pay for penalties. (Note that the maximum revocation penalty for any agreement is the full price.)

PG receives two types of tasks from the scheduler: negotiation tasks and revocation tasks. The scheduler has incomplete information about how PG will behave given each negotiation task. Given a resource r, t(r) is the expected negotiation time for getting resource r, c(r) is the price for getting resource r, and p(r) is the probability that PG can get resource r successfully. Without loss of generality, a resource in different plans has the same t(r), c(r), and p(r). After receiving a revocation task, PG will: (1) notify the other party involved in the agreement; (2) pay a penalty to the other party; (3) report to the scheduler. For ease of analysis, here we assume that: (1) revocation tasks cost PG no time; (2) each negotiation task involves only one resource; and (3) PG can only negotiate for one resource at each time. Therefore, the scheduler can submit another task if and only if PG finishes the previous task.

After receiving plans from the planner, the scheduler has the following choices: (1) submit a negotiation task to PG if it can presumably earn positive utility by scheduling; and (2) report "failure" to the planner if the scheduler finds that it could not schedule any plan within the reserve price δ and scheduling deadline τ. The following observation shows the conditions under which the scheduler will return "failure" directly at the beginning of scheduling:

If $$\min_{PL \in PS} \sum_{r \in PL} t(r) > \tau \text{ or } \min_{PL \in PS} \sum_{r \in PL} c(r) > \delta,$$

the scheduler will directly return failure information to the planner, as, in the first case, it is impossible for the scheduler to find a plan with agreements within the given scheduling time, and, in the latter case, NM cannot gain any positive utility.

Feasible plans refer to the set of plans whose resource requirements can still be possibly satisfied by future negotiation. Assume PG fails to reach an agreement for resource r, all plans which include the resource r will become infeasible. Therefore, the feasible resource set $\mathcal{PS}^t$ at scheduling round t has the following property: $\mathcal{PS}^t \subseteq \mathcal{PS}^{t-1} \subseteq \mathcal{PS}$. After getting the feedback from the PG at scheduling round t, the scheduler has the following four choices:

Submit another negotiation task to PG: If no plan's resource requirements have been satisfied and there is an opportunity to get all agreements for the resource requirements of one plan, the scheduler may submit a new negotiation task to PG. If one plan's resource requirements have been satisfied, the scheduler can still submit a negotiation task in order to satisfy the resource requirements of a better plan with lower cost.

Revoke one or more agreements: As scheduling continues, some agreements may become unnecessary. For example, resource r and r' appears and only appears in plan PL. If PG fails to get resource r, plan PL is unfeasible. Then the agreement for resource r' becomes unnecessary. Unnecessary agreements should be revoked as early as possible to minimize penalty.

Return a plan with agreements to the planner: Once all the resource requirements of one plan have been satisfied and there is no opportunity to satisfy the resource requirements of a better plan, the scheduler will return the plan with agreements to the planner and stop scheduling.

Return "failure" to the planner: If the budget constraint or the deadline constraint makes the scheduler unable to satisfy the resource requirements of any plan, the scheduler will return "failure" to the planner and stop scheduling.

A naive way to calculate the optimized schedule is by exhaustive search. If there are n resources in all the plans, the complexity of exhaustive search is $\mathcal{O}(n!)$. An alternative is to randomly choose a resource to negotiate during each scheduling round. Although the randomized approach has low complexity $\mathcal{O}(1)$, its scheduling results may be far from optimal. Principles of the invention therefore propose a voting-based approach and a weight-based approach to allow tradeoffs between complexity and utility.

II. Voting-Based Algorithm

As the complexity of exhaustive search factorially increases with the number of resources in the plans, it is infeasible to run the exhaustive search to find out the optimized schedule. To permit tradeoffs between the high complexity and utility, this section presents a voting-based approach which performs exhaustive searches on small resource sets and derives the negotiation schedule for large resource sets based on the search results.

A. Algorithm for Single-Plan Case

We begin with a simpler version of the problem in which there is only one plan PL, i.e., $\mathcal{PS} = \{PL\}$. At each step of scheduling, the scheduler needs to find out the next resource to be submitted to the PG for negotiation. The set of resources having not been negotiated at scheduling round t is $RT^t(PL) = \mathcal{PL} - \cup_{t'=0}^{t-1} T^{t'}$, where $T^{t'}$ is resource submitted at round t'. $RT^0(PL) = \mathcal{PL}$. $|RT^t(PL)| = |\mathcal{PL}| - t$ is the number of resources in $RT^t(PL)$. At round t, the scheduler finds the optimized schedule $\Lambda_o^t \in \Lambda^t$ in which $\Lambda^t$ represents all the possible schedules at round t and $T^{t'}(\Upsilon)$ is the negotiation task at round t' according to the schedule $\Upsilon \in \Lambda^t$. If negotiation for resource $T^{t-1}$ fails, PL's resource requirements cannot be satisfied and the scheduler will stop scheduling and revoke all agreements made before.

Given a schedule $\Upsilon$ at round t, the expected utility while conducting the schedule is $U(\Upsilon) = U_{suc}(\Upsilon) - P_{fail}(\Upsilon)$ where $U_{suc}(\Upsilon)$ is the utility of the scheduler when it gets all resources and $P_{fail}$ is the penalty the scheduler needs to pay if scheduling fails.

We have:

$$U_{suc}(\Upsilon) = \prod_{r \in RT^t(PL)} p(r)\left((1+\beta)\delta - \sum_{r \in \mathcal{PL}} c(r)\right)$$

$$P_{fail}(\Upsilon) = \sum_{t'=t}^{|\mathcal{PL}|-1} p_{fail}^{t'}(\Upsilon) P_{fail}^{t'}(\Upsilon)$$

where $P_{fail}^{t'}(\Upsilon)$ is the probability that the scheduler fails to get $T^{t'}(\Upsilon)$ and $P_{fail}^{t'}(\Upsilon)$ is the penalty that the scheduler needs to pay if it fails to get resource $T^{t'}(\Upsilon)$:

$$P_{fail}^{t'}(\Upsilon) = \prod_{t''=t}^{t'-1} p(T^{t''}(\Upsilon))(1 - p(T^{t'}(\Upsilon)))$$

$$P_{fail}^{t'}(\Upsilon) = \sum_{t''=0}^{t-1} \rho\left(c(T^{t''}), \sum_{t'''=t''+1}^{t-1} t(T^{t'''}) + \sum_{t'''=t}^{t'} t(T^{t'''}(\Upsilon))\right) + \sum_{t''=t}^{t'-1} \rho\left(c(T^{t''}), \sum_{t'''=t}^{t'} t(T^{t'''}(\Upsilon))\right)$$

The optimization problem for the scheduler is to find the optimized negotiation schedule $\Lambda_o^t$ for the remaining resources $RT^t(PL)$ at round t, which can be formalized as follows:

$$\Lambda_o^t = \max_{\Upsilon \in \Lambda^t}(U_{suc}(\Upsilon) - P_{fail}(\Upsilon))$$

It can be found that any schedule $\Upsilon \in \Lambda^t$ has the same $U_{suc}(\Upsilon)$ because changing the order of resources in any schedule $\Upsilon$ has no effect on $U_{suc}(\Upsilon)$. Thus, the schedule minimizing $P_{fail}(\Upsilon)$ would be the optimized schedule.

Let $|RT^t(\mathcal{PL})|=n$, then the complexity of finding the optimized schedule by exhaustive search is $\mathcal{O}(n!)$, which is computationally intractable. The intuition behind the voting-based approach is based on order invariability, which indicates the following: if resource r appears before resource r' in the optimized schedule for resource set R', then resource r appears before resource r' in the optimized schedule for resource set R" where $R' \subset R"$. Empirical evidence suggests that, in most cases (more than 90% in all our experiments), order invariability is valid. Given the deadline constraints and the high complexity of the problem, it is worthwhile to exploit the order invariability property when it almost applies.

Rather than exhaustively searching in the optimized schedule for remaining resources $RT^t(\mathcal{PL})$, in the voting-based approach, we only search the optimized schedule for a small set of resources $\mathcal{R} \subseteq RT^t(\mathcal{PL})$. Then we compute the schedule for $RT^t(\mathcal{PL})$ using the optimized schedules for all combinations of a smaller number of resources. Let $|\mathcal{R}|=q$, there are $$\binom{n}{q}$$

different combinations of resources of size q. The complexity of computing the optimized schedules for all $$\binom{n}{q}$$

combinations is $$\mathcal{O}\left(\binom{n}{q} q!\right)(\mathcal{O}(n^q))$$

($n^q$)) when q is constant). The complexity is reduced by $$\frac{n!}{\binom{n}{q}q!} = (n-q)!$$

Figure 3:
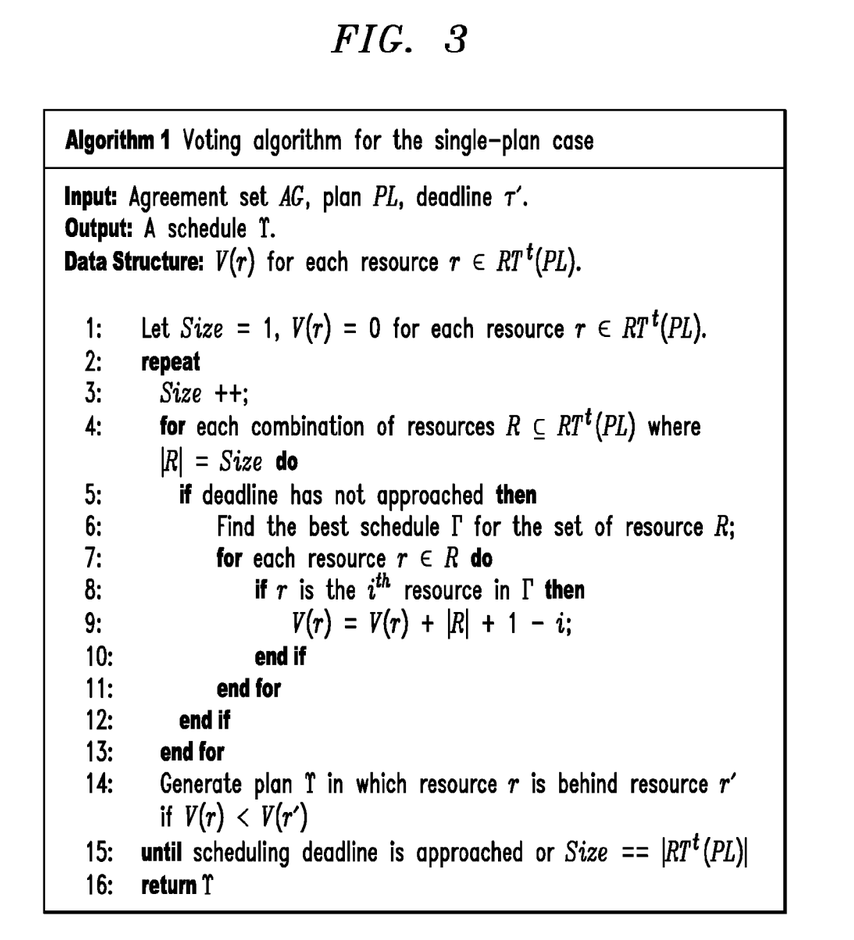
FIG. 3 illustrates a voting-based negotiation scheduling algorithm for individual plans, according to an embodiment of the invention.

Algorithm 1 in FIG. 3 shows how to find the schedule for $RT^t(\mathcal{PL})$ using voting. The input is the current agreement set $\mathcal{AG}$, the plan PL, and the deadline $\tau'$, which is the maximum time the algorithm can run. The output of the algorithm is a schedule $\Upsilon$ for $RT^t(\mathcal{PL})$.

V(r) denotes how many "votes" r receives; it is used to represent how desirable it is to negotiate resource r earlier. The resource with the highest V(r) will be negotiated first. Size represents the number of resources which will be used to run exhaustive search. At the beginning, Size is set to 2 and the scheduler will first find the optimized schedule of every pair of resources. Then Size will be set to 3 and all combinations of three resources are searched, then Size is set to 4, 5, and so on.

For each combination of resources $\mathcal{R}$, the scheduler will search all possible schedules and choose the one with the highest utility as the optimized schedule $\Gamma$. The i th resource in an optimized schedule of q resources receives a "vote" of q+1−i and V(r) is increased by the "votes" from all combinations where r appears.

After scheduling all the combinations of Size resources, the output schedule $\Upsilon$ will be updated. if V(r)<V(r'), resource r will be negotiated later than resource r' in the plan $\Upsilon$. The algorithm will stop when the scheduling deadline is reached or all possible schedules have been searched, i.e., Size=|$RT^t(\mathcal{PL})$|. When the algorithm stops, the latest schedule $\Upsilon$ will be returned.

The algorithm is an anytime algorithm in the sense that with more time, the algorithm will search the optimized schedule of a larger number of negotiation tasks with the increase of Size. With more time, the schedule returned by the algorithm is better.

B. Algorithm for the Multi-Plan Case

If there is more than one feasible plan, we can run the voting algorithm for each plan, and then compute the overall weight w(r) for each resource $r \in RT^t(\mathcal{PS}^t)$ at round t where $RT^t(\mathcal{PS}^t) = \cup_{PL \in PS^t} RT^t(\mathcal{PL})$ is the set of all possible negotiation tasks.

Figure 4:
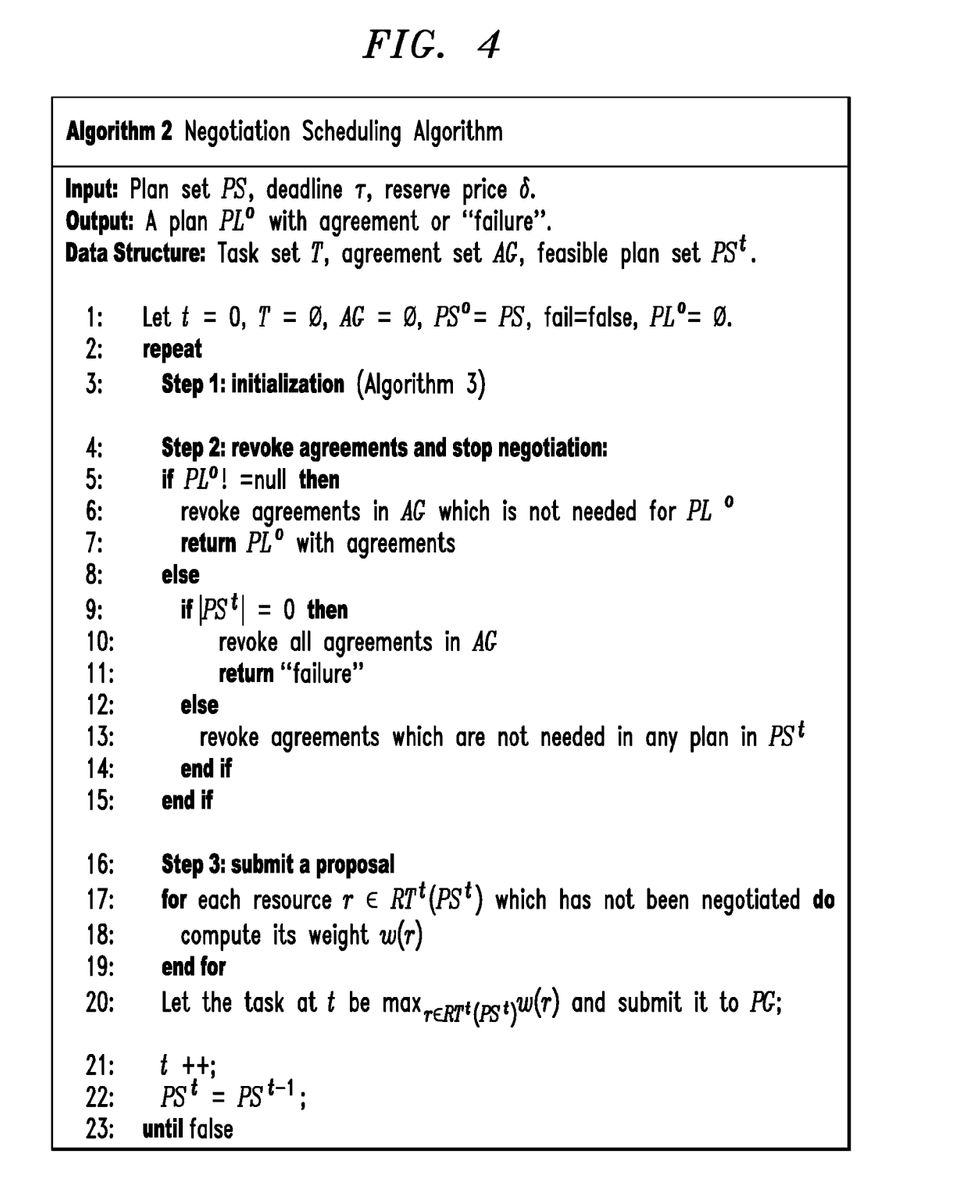
FIG. 4 illustrates a negotiation scheduling algorithm for multiple plans, according to another embodiment of the invention.
Figure 5:
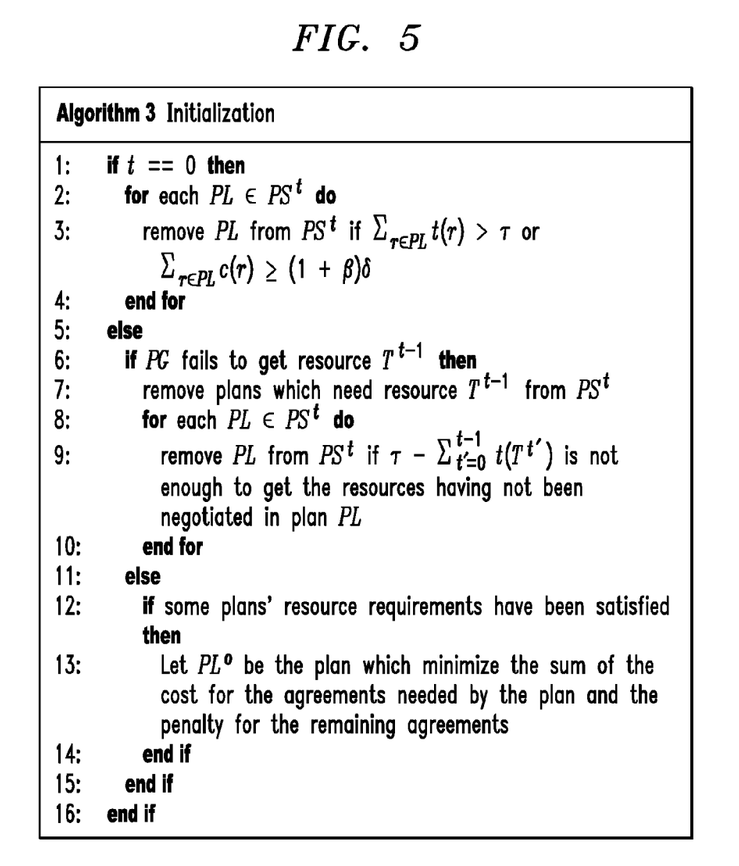
FIG. 5 illustrates an initialization step of the negotiation scheduling algorithm in FIG. 4, according to an embodiment of the invention.

Algorithm 2 in FIG. 4 describes the procedure to determine the negotiation task at each round t. The input of the algorithm is the set $\mathcal{PS}$ of plans submitted by the planner, deadline $\tau$, and reserve price $\delta$. The output is the plan $PL^o$ with agreement if scheduling succeeds or "failure" otherwise. During scheduling, the scheduler maintains the following data structure: task set $\mathcal{T}$, agreement set $\mathcal{AG}$, feasible plan set $\mathcal{PS}^t$. Algorithm 2 includes the following three main steps:

At the beginning of each round, the scheduler updates its data structure given the last round's negotiation result. This is illustrated in Algorithm 3 in FIG. 5. If t=0, these plans which cannot satisfy the budget and deadline constraints will be removed from $\mathcal{PS}^t$. When t>0, if PG fails to get resource $T^{t-1}$, it will first remove plans which need resource $T^{t-1}$ from $\mathcal{PS}^t$. Then it will check whether the remaining scheduling time $\tau - \Sigma_{t'=0}^{t-1} t(T^{t'})$ is enough to get the resources having not been negotiated in plan PL. If not, it will remove PL from $\mathcal{PS}^t$. If PG's negotiation at round t−1 is successful, some plans' resource requirements may have been satisfied. Assume the satisfied plans are $\mathcal{PS}_s \subseteq \mathcal{PS}^t$ and a plan $PL \in \mathcal{PS}_s$ needs a set of agreements $\mathcal{AG}$ (PL). The following plan will be chosen as $PL^o$:

$$PL^o = \min_{PL \in \mathcal{PS}_s} \left( \sum_{r \in PL} c(r) + \sum_{Ag \in \mathcal{AG} - \mathcal{AG}(PL)} \rho\left(Prc(Ag), \sum_{t'=0}^{t-1} t(T^{t'}) - T_{mk}(Ag)\right) \right)$$

In other words, $PL^o$ is the plan that minimizes the sum of the cost for the agreements needed by the plan and the penalty for revoking the remaining agreements.

The second step is revoking unnecessary agreements and checking whether to stop scheduling. There are three situations:

(1) $PL^o$!=null, i.e., one plan's resource requirements have been satisfied. The scheduler will revoke all unnecessary agreements $\mathcal{AG} - \mathcal{AG}(PL^o)$ and return plan $PL^o$ with agreements $\mathcal{AG}(PL^o)$ to the planner.

(2) |$\mathcal{PS}^t$|=0, which means that scheduling fails because there is no satisfiable plan left. The scheduler will revoke all agreements $\mathcal{AG}$ and return "failure" to the planner.

(3) $PL^o$=null and $\mathcal{PS}^t$>0, which indicates scheduling will continue and the scheduler will revoke agreements which are not needed in any plan in $\mathcal{PS}^t$.

The most important part is deciding which resource to negotiate at round t. For each resource $r \in RT^t(\mathcal{PS}^t)$, its weight w(r) represents how desirable it is to negotiate it first. That is, the negotiation task during round t is the resource with the highest weight, i.e.:

$$T^t = \max_{r \in RT^t(\mathcal{PS}^t)} w(r)$$

in which w(r) is given by:

$$w(r) = \sum_{PL} w(r, PL)$$

where w(r,PL) is the weight of resource r in plan PL.

To compute w(r,PL), the scheduler will first run the voting algorithm to generate the schedule for $RT^t(\mathcal{AG})$. To get the schedule for the remaining resource $RT^t(\mathcal{PL}) \subseteq \mathcal{PL}$, the scheduler decides the deadline $\tau'$ to run Algorithm 1. Let $\tau''$ be the remaining scheduling time and it follows that $\tau'' \geq \max_{PL \in PS^t} \Sigma_{r \in RT^t(PL)} t(r)$ as otherwise, the plan PL will not be feasible. Here we use a heuristic to decide the value of $\tau'$:

$$\tau' = \frac{\tau'' \frac{\sum_{PL \in \mathcal{PS}^t} \sum_{r \in RT^t(PL)} t(r)}{|\mathcal{PS}^t|}}{|\cup_{PL \in PS^t} RT^t(\mathcal{PL})|}$$

where $$\frac{\sum_{PL \in \mathcal{PS}^t} \sum_{r \in RT(\mathcal{PL})^t}(r)}{|\mathcal{PS}^t|}$$

is the average negotiation time for each remaining plan and $|\cup_{PL \in \mathcal{PS}^t} RT^t(\mathcal{AG})|$ is the number of resources in all the remaining plans.

After getting the schedule $\Upsilon$ for $RT^t(\mathcal{AG})$ of the plan PL using Algorithm 1, the weight w(r,PL) of resource $r \in RT^t(\mathcal{AG})$ is $$w(r, PL) = \begin{cases} \frac{|RT^t(\mathcal{PL}))| + 1 - i}{\sum_{r \in PL} c(r)} \\ 0 \end{cases}$$

if r is the $i^{th}$ resource in $\Upsilon$ otherwise.

It can be found that the higher the order of resource r in the scheduler $\Upsilon$ for PL, the higher the value of w(r,PL). If r appears first in all the schedulers for plans $\mathcal{PS}^t$, r will be chosen as $T^t$.

It can be found in Algorithm 2 that the scheduler will stop scheduling once the resource requirements of one plan are satisfied. This is partly because in our approach, a plan with lower cost has a higher chance to be satisfied before a plan with higher cost. In addition, given a plan with agreements, the scheduler needs to revoke agreements made before if it finds another plan with agreements. Moreover, uncertainty about negotiation results makes it possible that the scheduler fails to satisfy the resource requirements of another plan but pays more penalties.

Let $n=|\cup_{PL \in \mathcal{PS}} \mathcal{PL}|$ be the number of resources in all plans $\mathcal{PS}$ and $m=|\mathcal{PS}|$ be the number of plans. If Size=q, the complexity of using the voting-based approach to determine the negotiation task at round t is $$O\left(m \binom{n}{q} q!\right) = O(mn!/(n-q)!) = O(mn^q).$$

We can find that even we choose very small voting depth q, the complexity of the voting-based approach is still high. In the next section, we present a weight-based approach, which has a lower complexity of $\mathcal{O}(mn)$.

III. Weight-Based Approach

This section presents a weight-based approach. Rather than doing an exhaustive search on a small scale, the weight of each resource is computed directly by considering the characteristics of the multiple plans and resources in these plans.

A. Analysis for the Single-plan Case

Different resources have different prices, probabilities of successful negotiation, and negotiation times. It would help the scheduler to find the optimized schedule if we can find how those resource properties will affect the optimized schedule.

We observe that resources with higher prices should be negotiated later. In other words, cheaper resources should be negotiated before the expensive resources.

This observation corresponds to the intuition that if we negotiate a resource with a higher price first, the revocation penalty later will also be higher when the agreement becomes unnecessary as the penalty increases with the price in the agreement.

Further we observe that resources with higher success probabilities should be negotiated later. In other words, resources with higher success rates should be negotiated first.

This observation corresponds to the intuition that if we negotiate resources with lower success probabilities later, the scheduler will have higher probability of failing to obtain those resources and will have to revoke agreements made before, thus paying more penalties. Therefore, we would like to first negotiate resources which are difficult to get, in order to reduce such revocation penalties.

B. Analysis for the Multi-plan Case

The two observations above are helpful while developing scheduling algorithms. However, different resources have different success probabilities and prices. Thus, the scheduler makes tradeoffs to solve the conflicts between different properties. In addition, the two observations are valid for the single-plan case. In the multiple-plan case, in addition to success probability and price, the following factors also are considered:

Appearance frequency. Assume there are two resources r and r'. r appears in most plans and resource r' appears much less than r. Assume there is no big difference in r and r''s other properties like price. It is intuitive to negotiate resource r first because if PG cannot get resource r, PG does not need to consider those plans which need resource r anymore. An extreme situation is that resource r appears in all the plans. Clearly, we need to get resource r first. If PG fails to get resource r, scheduling stops. If the scheduler lets PG negotiate for r' first and PG successfully gets resource r', then the scheduler later needs to pay for revoking the agreement about r' when PG fails to get resource r.

Plan cost: The cost of a plan PL is $C(PL) = \sum_{r \in \mathcal{PL}} c(r)$. The costs of different plans may vary. Regardless of other factors like negotiation time, the scheduler would like to satisfy the resource requirements of the plan with lower cost first as the scheduler will try to maximize its utility, which will decrease with the increase of the plan cost.

Based on our observations and intuitions, we propose a heuristic to compute the weight w(r,PL) of resource r as follows:

$$w(r, PL) = f\left(\sum_{r \in PL} c(r), p(r), |RT^t(\mathcal{PL})|\right)$$

where $\sum_{r \in \mathcal{PL}} c(r)$ is the cost of the plan PL, $|RT^t(\mathcal{AG})|$ is the number of resources to be negotiated in plan PL. w(r,PL) will satisfy the following properties:

w(r,PL) decreases with $\sum_{r \in \mathcal{PL}} c(r)$. That is, if the cost of the plan is high, any resource of this plan has a lower probability to be negotiated first.

w(r,PL) decreases with p(r), which corresponds to our previous proposition that the resource with lower success probability should be negotiated first.

w(r,PL) decreases with $|RT^t(\mathcal{AG})|$. With fewer remaining resources to be negotiated, the scheduler can know whether it can satisfy the resource requirements of the plan in shorter rounds. Thus, it is reasonable to negotiate plans with less resources first because those plans seem more likely to succeed.

w(r) is the sum of the weight of resource r in all the plans. If the resource r appears more in those plans, it will have a higher weight. Therefore, it has a higher probability of being negotiated first. In other words, frequently appearing resources will be negotiated first. An example function to compute w (r,PL) is:

$$w(r, PL) = \begin{cases} \frac{1}{\sum_{r \in PL} c(r)p(r)|RT'(\mathcal{PL})|} & \text{if } r \in RT'(\mathcal{PL}) \\ 0 & \text{otherwise} \end{cases}$$

Given w(r,PL) of each resource in plan PL, we can compute the weight w(r) of each resource r∈RT'($\mathcal{PS}^t$). Then we can use Algorithm 2 to determine the negotiation task at each round.

The complexity of the weight-based approach at each scheduling round is $\mathcal{O}$ (nm) where n=| $\cup_{PL \in PS} \mathcal{PL}$ | is the number of resources in all the m=|$\mathcal{PS}$| plans. Clearly, the weight-based approach has much lower complexity than the voting-based approach, even when the voting depth is small. When the voting depth is q, the complexity of the voting based approach is $\mathcal{O}$ (n$^q$m), which is higher than $\mathcal{O}$ (nm).

Figure 6:
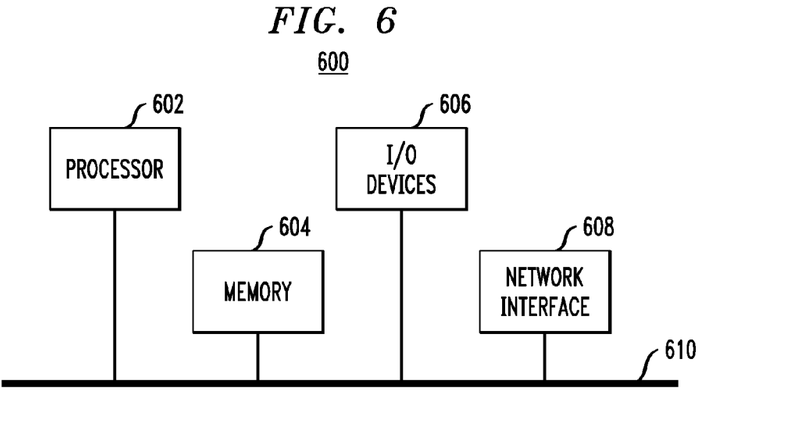
FIG. 6 illustrates a computer system in accordance with which one or more components/steps of negotiation management techniques may be implemented, according to an embodiment of the invention.

Referring lastly to FIG. 6, a computer system 600 is shown in accordance with which one or more components/steps of negotiation management techniques of the invention may be implemented. It is to be further understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 6 may represent one or more servers or one or more other processing devices capable of providing all or portions of the functions described herein. Alternatively, FIG. 6 may represent a mainframe computer system.

That is, computer system 600 may be one or more computer systems that are part of a data stream processing system at a particular site, such that one or more of the NM component, the planner, the site policy management component, and resource components are implemented thereon.

The computer system 600 may generally include a processor 602, memory 604, input/output (I/O) devices 606, and network interface 608, coupled via a computer bus 610 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard disk drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An automated method of negotiating for resources in a data processing system, wherein the data processing system comprises multiple sites, the method comprising a negotiation management component of a computer system at a given one of the sites performing the steps of:

obtaining one or more tasks from at least one source of one or more plans, each plan being annotated with one or more needed resources and one or more potential resource providers at one or more sites in the data processing system;

computing an optimized resource negotiation schedule based on the one or more obtained tasks, wherein the schedule comprises an optimized order in which resources are negotiated and wherein the optimized order is determined by computation of a function which minimizes a negotiation cost value while maximizing a scheduling utility value, wherein minimizing the negotiation cost value includes consideration of a negotiation time for getting a resource;

in accordance with the optimized resource negotiation schedule, sending a request for each needed resource to the one or more potential resource providers such that a negotiation process is performed between the negotiation management component and at least one of the potential resource providers;

wherein the step of computing the optimized resource negotiation schedule further comprises performing a voting-based methodology in accordance with a given resource set, wherein the voting-based methodology utilizes an algorithm wherein a scheduling deadline is a maximum time the algorithm can run; and wherein the voting-based methodology further comprises searching on a subset of the given resource set and deriving the optimized resource negotiation schedule for the given resource set based on a result of searching the subset.

2. The method of claim 1, wherein when an agreement is reached between the negotiation management component and the potential resource provider, the negotiation management component sends the agreement to the task source from which one or more plans were obtained such that at least one of the one or more plans are executable using the negotiated agreement.

3. The method of claim 1, wherein the negotiation management component comprises a scheduler and a proposal generator such that the scheduler performs the plan obtaining step and the optimized resource negotiation schedule computing step, and the proposal generator performs the request sending step in accordance with the optimized resource negotiation schedule.

4. The method of claim 1, wherein the optimized resource negotiation schedule is computed in accordance with at least one of a cost constraint and a time constraint.

5. The method of claim 4, wherein the cost constraint comprises a reserve price for obtaining resources required for at least one candidate plan.

6. The method of claim 2, further comprising the step of the negotiation management component revoking a negotiated agreement with a resource provider subject to a given penalty.

7. The method of claim 6, wherein the penalty is dependent on time.

8. The method of claim 6, wherein the penalty is independent of time.

9. The method of claim 6, wherein the penalty is dependent on which party revokes the agreement.

10. The method of claim 1, wherein the optimized resource negotiation schedule is computed for a single plan.

11. The method of claim 1, wherein the optimized resource negotiation schedule is computed for multiple plans.

12. The method of claim 1, wherein the step of computing the optimized resource negotiation schedule further comprises performing a weight-based methodology in accordance with a given resource set.

13. The method of claim 12, wherein the weight-based methodology comprises computing a weight for each resource in the given resource set.

14. The method of claim 13, wherein the computed weight for a resource is a representation of how the given resource affects the optimized resource negotiation schedule.

15. The method of claim 14, wherein the computed weight for a resource depends on a cost, a probability of success, and a frequency in all plans for the resource.

16. The method of claim 1, wherein negotiation comprises multiple rounds, each round being for one particular resource, and such that an agreement is revoked based on latest negotiation results.

17. Apparatus for negotiating for resources in a data processing system, wherein the data processing system comprises multiple sites, the apparatus comprising: a memory; and a processor coupled to the memory and configured to: obtain one or more tasks from at least one source of one or more plans, each plan being annotated with one or more needed resources and one or more potential resource providers at one or more sites in the data processing system; compute an optimized resource negotiation schedule based on the one or more obtained tasks wherein the schedule comprises an optimized order in which resources are negotiated and wherein the optimized order is determined by computation of a function which minimizes a negotiation cost value while maximizing a scheduling utility value, wherein minimizing the negotiation cost value includes consideration of a negotiation time for getting a resource; in accordance with the optimized resource negotiation schedule, send a request for each needed resource to the one or more potential resource providers such that a negotiation process is performed between the negotiation management component and at least one of the potential resource providers;

wherein the step of computing the optimized resource negotiation schedule further comprises performing a voting-based methodology in accordance with a given resource set, wherein the voting-based methodology utilizes an algorithm wherein a scheduling deadline is a maximum time the algorithm can run; and wherein the voting-based methodology further comprises searching on a subset of the given resource set and deriving the optimized resource negotiation schedule for the given resource set based on a result of searching the subset.

18. An article of manufacture for negotiating for resources in a data processing system, wherein the data processing system comprises multiple sites, the article comprising a computer readable non-transitory tangible storage medium including one or more programs which when executed by a computer system perform the steps of:

obtaining one or more tasks from at least one source of one or more plans, each plan being annotated with one or more needed resources and one or more potential resource providers at one or more sites in the data processing system;

computing an optimized resource negotiation schedule based on the one or more obtained tasks, wherein the schedule comprises an optimized order in which resources are negotiated and wherein the optimized order is determined by computation of a function which minimizes a negotiation cost value while maximizing a scheduling utility value, wherein minimizing the negotiation cost value includes consideration of a negotiation time for getting a resource;

in accordance with the optimized resource negotiation schedule, sending a request for each needed resource to the one or more potential resource providers such that a negotiation process is performed between the negotiation management component and at least one of the potential resource providers;

wherein the step of computing the optimized resource negotiation schedule further comprises performing a voting-based methodology in accordance with a given resource set, wherein the voting-based methodology utilizes an algorithm wherein a scheduling deadline is a maximum time the algorithm can run; and wherein the voting-based methodology further comprises searching on a subset of the given resource set and deriving the optimized resource negotiation schedule for the given resource set based on a result of searching the subset.

19. The method of claim 1, wherein the optimized resource negotiation schedule is derived from heuristics based on the characteristics of the resources.

* * * * *